United States Patent Office 2,868,859
Patented Jan. 13, 1959

2,868,859

CURING NATURAL RUBBER LATEX WITH A PEROXIDE

Geoffrey Stott, Harlow, England

No Drawing. Application June 9, 1954
Serial No. 435,631

Claims priority, application Great Britain June 12, 1953

3 Claims. (Cl. 260—773)

This invention relates to a process of vulcanising natural rubber latex or concentrates of natural rubber latex.

Hitherto, sulphur-containing compounds have usually been employed for effecting the vulcanisation of rubber or rubber latex.

It has however already been proposed to cause organic peroxides to react with dry rubber at elevated temperatures in order to bring about cross-linking between rubber molecules. In this process it is generally found that in order to achieve a satisfactory degree of cross-linking in the dry rubber, substantial quantities of relatively expensive organic peroxides are required so that this method of vulcanisation is uneconomic.

In general it would appear that peroxides, of the type usually employed for vulcanising dry rubber, dissociate to form active species in sufficient quantity to facilitate the desired degree of reaction in a reasonable time at temperatures in excess of 140° C. This fact in itself would seem to preclude the possibility of effecting a reaction similar to that obtained with dry rubber, in natural rubber latex. Nevertheless, contrary to expectation, it has now been found that natural rubber latex and rubber latex concentrates prepared therefrom can be heated under conditions precluding loss of water, i. e. under pressure, in the presence of an organic peroxide to temperatures in excess of 140° C. and even up to 170° C. (or slightly more) without appreciable coagulation and with only slight loss of mechanical stability as measured by standard methods.

Based on the foregoing discovery, the present invention contemplates a process of vulcanising natural rubber latices and rubber latex concentrates which comprises reacting aqueous dispersion said latices or concentrates with an organic peroxide under superatmospheric pressure and at temperatures in excess of 100° C. and preferably in excess of 140° C. in order to bring about cross-linking between the rubber molecules.

It has been found that the amount of organic peroxide which is required for effecting vulcanisation varies inversely with the reaction temperature employed and with the reaction period. Consequently, since organic peroxides are relatively expensive chemicals, it is more economical to employ comparatively small percentages thereof, e. g. within the limits of 1 to 5% by weight of the total solids content of the latex or concentrate and reaction temperatures lying between 140° and 170° C.

In order to avoid or to minimise any coagulation of the rubber latex, one or more of the usual stabilisers such as soaps, sulphated vegetable oils, sulphated long chain hydrocarbons, proteins and the like may be incorporated therewith prior to the vulcanisation with organic peroxide.

The reaction product can be dried or coagulated and yields a vulcanised rubber film having properties not obtainable in vulcanised rubbers prepared by the conventional methods.

Films prepared from rubber latex vulcanised in accordance with the present invention have an excellent resistance to heat ageing. Such films also exhibit a greater degree of transparency and a paler colour than films obtained from sulphur vulcanisates and are moreover substantially tasteless and odourless.

The invention will be illustrated by the following examples:

*Example I*

200 ml. of 60% centrifuged rubber latex stabilised with ammonia were mixed by stirring with a mixture of 2% of di-tertiary-butyl peroxide and 0.4% of oleic acid, both calculated on the total solids weight of the latex. The mixture was sealed in a pressure vessel which was then immersed in an oil-bath at 170° C. and maintained at this temperature for a period of 15 minutes, after which the product was extracted and filtered.

The rubber in the resultant stable latex was found to be in a vulcanised condition, yielding films which were very pale and transparent.

*Example II*

200 ml. of centrifuged rubber latex stabilised with ammonia were mixed with 2% of di-tertiary butyl peroxide and the mixture treated in the manner set forth in Example I.

The resultant vulcanised latex was of satisfactory stability and exhibited properties similar to that described in Example I.

*Example III*

170 ml. of 60% centrifuged latex were diluted with 30 ml. of water and mixed with 1% of di-tertiary butyl peroxide. The mixture was heated in a sealed vessel to 170° C. for 6 minutes, and rapidly cooled before being extracted and filtered.

Rubber films were cast from the resultant stable prevulcanised latex, and the physical properties measured before and after ageing artificially in a Geer oven at 70° C.

The results obtained were:

| | Elongation at Break, Percent | Load at Break, kg./cm.² |
|---|---|---|
| Unaged films | 745 | 168 |
| Aged 14 days | 757 | 200 |
| Aged 29 days | 756 | 191 | showing that the physical properties of the said films were virtually unaffected by heat ageing.

*Example IV*

170 ml. of 60% centrifuged latex stabilised with ammonia were mixed with 30 ml. water and with 2% of ditertiary butyl peroxide, reckoned on the total solids weight of the latex. The mixture was placed in a sealed vessel and heated to 140° C. for 30 minutes. It was then rapidly cooled, the product extracted and filtered.

The resultant latex on evaporation yielded a film which showed a breaking elongation of 873% and a load at break of 251 kg./cm.².

*Example V*

To 200 ml. of 60% centrifuged latex stabilised with ammonia was added a mixture of 2% di-tertiary butyl peroxide and 0.4% of lauric acid, both based on the total solids weight of the latex.

After placing the mixture in a sealed vessel and heating at 170° C. for 8 minutes, the resultant latex yielded a film which showed a load at break of 211 kg./cm.².

*Example VI*

To 170 mls. of 60% centrifuged latex stabilised with ammonia was added 4% di-tertiary butyl peroxide, based based on the total solids weight of the latex. The mixture was placed in a sealed vessel and heated to 170° C. for 2 minutes. The vessel was then rapidly cooled and the resultant vulcanised latex extracted and filtered.

A film from this product showed an elongation at break of 812% and a load at break of 150 kg./cm.$^2$.

I claim:

1. The process of vulcanizing an aqueous dispersion of natural rubber comprising the steps of reacting said dispersion with ditertiary butyl peroxide under superatmospheric pressure at a temperature ranging between 140° C. to 170° C. for a period extending between two to thirty minutes, whereby cross-linking occurs between the rubber molecules of said dispersion, said ditertiary butyl peroxide being employed within the range of 1% to 5% based on the weight of the total solids of said rubber dispersion.

2. The process according to claim 1, wherein said dispersion is concentrated natural rubber latex.

3. The process according to claim 1, in which the mixture of rubber dispersion and ditertiary butyl peroxide is brought into reaction in the presence of an emulsion stabilizer sealed in a pressure vessel prior to heating.

References Cited in the file of this patent

UNITED STATES PATENTS 2,265,324     Spence     Dec. 9, 1941

OTHER REFERENCES

Farmer et al.: Jour. of the Chem. Soc., pages 142–148.